US008044780B2

(12) United States Patent
Tseng et al.

(10) Patent No.: US 8,044,780 B2
(45) Date of Patent: Oct. 25, 2011

(54) METHOD AND APPARATUS FOR PREDICTING/ALARMING THE MOVING OF HIDDEN OBJECTS

(75) Inventors: Kuo-Shih Tseng, Taichung County (TW); Hsiang-Wen Hsieh, Miaoli County (TW); Wei-Han Wang, Taipei County (TW)

(73) Assignee: Industrial Technology Research Institute, Hsin-Chu (TW)

( * ) Notice: Subject to any disclaimer, the term of this patent is extended or adjusted under 35 U.S.C. 154(b) by 633 days.

(21) Appl. No.: 12/019,975

(22) Filed: Jan. 25, 2008

(65) Prior Publication Data

US 2009/0058677 A1 Mar. 5, 2009

(30) Foreign Application Priority Data

Sep. 27, 2007 (TW) .............................. 96135862 A

(51) Int. Cl.
*B60Q 1/00* (2006.01)
*G08G 1/00* (2006.01)
*G08G 1/16* (2006.01)
*G01S 13/00* (2006.01)

(52) U.S. Cl. ........ 340/435; 340/436; 340/903; 340/904; 342/70

(58) Field of Classification Search ........................ None
See application file for complete search history.

(56) References Cited

U.S. PATENT DOCUMENTS

| | | | | |
|---|---|---|---|---|
| 5,767,793 | A * | 6/1998 | Agravante et al. | 340/903 |
| 6,339,369 | B1 * | 1/2002 | Paranjpe | 340/436 |
| 6,670,910 | B2 * | 12/2003 | Delcheccolo et al. | 342/70 |
| 6,674,394 | B1 * | 1/2004 | Zoratti | 342/70 |
| 7,212,653 | B2 * | 5/2007 | Sato et al. | 382/104 |
| 7,696,863 | B2 * | 4/2010 | Lucas et al. | 340/435 |
| 2002/0147534 | A1 * | 10/2002 | Delcheccolo et al. | 701/45 |
| 2003/0169181 | A1 * | 9/2003 | Taylor | 340/902 |
| 2007/0216520 | A1 * | 9/2007 | Ho | 340/435 |
| 2007/0279199 | A1 * | 12/2007 | Danz et al. | 340/435 |
| 2008/0018523 | A1 * | 1/2008 | Kelly et al. | 342/70 |
| 2009/0045928 | A1 * | 2/2009 | Rao et al. | 340/435 |

FOREIGN PATENT DOCUMENTS

| | | |
|---|---|---|
| JP | 2006309623 | 11/2006 |
| TW | 503630 | 9/2002 |
| TW | 253998 | 5/2006 |
| TW | 284297 | 7/2007 |

* cited by examiner

*Primary Examiner* — Jennifer Mehmood
*Assistant Examiner* — Fekadeselassie Girma
(74) *Attorney, Agent, or Firm* — WPAT, PC; Justin King

(57) ABSTRACT

The invention relates to a method and apparatus for predicting/alarming the moving of hidden objects. The apparatus comprises: a distance sensing unit, for obtaining a distance data detected within a specific sensing range and thus outputting the distance data; a speed sensing unit, for measuring the movement of a carrier to obtain a real-time speed data of the carrier and thus output the speed data; a control unit, for receiving and analyzing the distance data and the speed data to obtain information relating to the position of the carrier, the environment surrounding the carrier and positions of objects moving in the blind spots of the carrier, and thus to perform an evaluation based upon the aforesaid information to determine a danger level for issuing a control signal accordingly; and an alarm unit, for issuing an alarm signal according to the control signal.

20 Claims, 14 Drawing Sheets

METHOD AND APPARATUS FOR PREDICTING/ALARMING THE MOVING OF HIDDEN OBJECTS

FIELD OF THE INVENTION

The present invention relates to a method and apparatus for predicting/alarming the moving of hidden objects, and more particularly, to a method and system capable of detecting and predicting movements of an moving object no matter the moving object is in sight or not. In an exemplary embodiment, when an object moving in the visual field of a user is shielded and hidden behind an obstacle, the aforesaid system is able to detect the hidden object using more than one set of sensors, each including a distance sensing unit and a speed sensing unit, while basing upon the detection to predict the movement of the hidden object by the operation of a control unit and thus making an estimation to obtain a danger level according to the prediction and the same time issuing an alarm or indication based upon the prediction. Therefore, a carrier such as a vehicle, configured with the aforesaid system and method, is able to actively assist its driver to cope with dangerous traffic conditions and thus drive safely.

BACKGROUND OF THE INVENTION

Please refer to FIG. 1, which shows how a driver's visual field is going to change with respect to different driving speeds. As modern transportation means, such as cars, is becoming a necessity in our daily life, it is a common knowledge that the faster a driver is driving a car, the narrow the visual field of the driver will have. As shown in FIG. 1, the visual field range 11 of a driver is about 210 degrees when the vehicle is still, but the range 12 will reduce to about 100 degrees when the vehicle is moving at 40 kilometers per hour; and the visual field range 13 will even reduce to about 65 degrees when it is traveling at 70 kilometers per hour, and moreover the visual field range 14 will even reduce to about 40 degrees when it is traveling at 100 kilometers per hour. Please refer to FIG. 2, which shows how the blind spot area of a driver driving a vehicle is going to change with respect to different driving speeds. It is known that a driver's blind spot area is defined as the portion of the ambient environment in the vicinity of the vehicle in which an object will not normally be observed by the use of the interior and exterior mirrors of the vehicle. As shown in FIG. 2, although the vehicle is attached with interior and exterior rearview mirrors for enabling the driver to see objects in a rear area 16, there are still two blind spot areas 15 formed at the two sides of the vehicle. In addition, it is noted that the faster the vehicle is traveling, the larger the blind spot areas 15 will be.

Please refer to FIG. 3, which is a schematic diagram showing a blind spot area formed at the left-rear side of a vehicle. In FIG. 3, the driver of the vehicle 17 is able to see another vehicle 18 overtaking from the left side thereof from its rearview mirrors as a portion of the vehicle 18 is located inside the visible rear area 19. However, as the overtaking progresses, the whole vehicle is going to enter the blind spot area 20 and become invisible to the driver that might be dangerous if the driver should decide to change to the left lane at the same time.

Please refer to FIG. 4, which shows a vehicle traveling in the visual field of a driver is shielded by another vehicle also traveling in the visual field and thus is hidden. In FIG. 4, the visual field of a driver driving the vehicle 17 is obstructed by another vehicle 21 overtaking from the left side thereof, by which the front left visual field of the vehicle 17 is reduced to a very small area 19 as that enclosed in the dotted line while creating a new blind spot area 20. Therefore, another vehicle 22 traveling in a direction perpendicular to and toward the vehicle 17, which was originally capable of being seen by the driver if there is no such vehicle 21 overtaking the same, will now be traveling in the blind spot area 20 of the vehicle 17 and become invisible to the driver. Thereby, the driver of the vehicle 17 tends to keep driving straight ahead without any aware of the vehicle 22 is approaching from the left so that it is ease to cause traffic accident. Since most drivers will not be aware of the blind spots 20 created by another overtaking vehicle, as those shown in FIG. 3 and FIG. 4, he/she might make some driving decisions with fetal consequences, such as taking a lane change at the wrong time and speed. Therefore, it is in need of a method and apparatus capable of not only tracking any vehicle traveling in the blind spot areas in an effective manner, but also predicting the moving direction and speed of a hidden object when the object originally moving in the visual field of a user is shielded and hidden behind an obstacle while issuing an alarm to warn the user and the same time establishing a recommendation for preventing from colliding with the hidden object.

SUMMARY OF THE INVENTION

The object of the present invention is to provide a method and apparatus for predicting/alarming the moving of hidden objects, by which when an object moving in the visual field of a user is shielded and hidden behind an obstacle, the aforesaid apparatus is able to obtain an environment data relating to the ambient environment of the user by the use of more than one distance sensing units, and a real-time speed data of the user by the use of a speed sensing unit, while using the two obtained data to perform a calculation basing upon a specific algorithm for obtaining the dynamic data of a moving object moving in a blind spot area of the user upon and thus issuing an alarm or indication based upon the dynamic data to the user. Therefore, a carrier such as a vehicle, configured with the aforesaid system and method, is able to actively assist its driver to detect no only those objects moving in conventional blind spots, but also those moving behind obstacles and hidden from being seen by the driver, and thus driving safely can be improved.

To achieve the above object, the present invention provides an apparatus for predicting/alarming the moving of hidden objects, comprising: a distance sensing unit, for obtaining a distance data detected within a specific sensing range and thus outputting the distance data; a speed sensing unit, for measuring the movement of a carrier to obtain a real-time speed data of the carrier and thus output the speed data; a control unit, for receiving and analyzing the distance data and the speed data to obtain information relating to the position of the carrier, the environment surrounding the carrier and positions of objects moving in the blind spot areas of the carrier, and thus to perform an evaluation based upon the aforesaid information to determine a danger level for issuing a control signal accordingly; and an alarm unit, for issuing an alarm signal according to the control signal.

To achieve the above object, the present invention provides a method for predicting/alarming the moving of hidden objects, comprising the steps of: using the detection of a distance sensing unit and a speed sensing unit to obtain an environment data; transmitting the environment data to a control unit; enabling the control unit to perform an operation basing upon the environment data detected by the distance sensing unit and the speed sensing unit for separating a moving object from its static ambient environment; enabling the control unit to classify the result of the aforesaid operation; making an evaluation to determining whether the moving object is being shielded and thus hidden in a blind spot area; if not, keep tracking the moving object; otherwise, a prediction process is initiated basing on the position of the moving object before it moved into the blind spot area; enabling the control unit to determine a danger level according to the relation between the environment data, the position of a carrier and the predicted position of the moving object in the blind spot area and thus outputting an alarm signal to an alerting unit according to the danger level; and enabling a driver driving the carrier to aware the condition of his/her ambient environment and the status of the hidden object moving in the blind spot area by the prediction and alert of the alerting unit.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
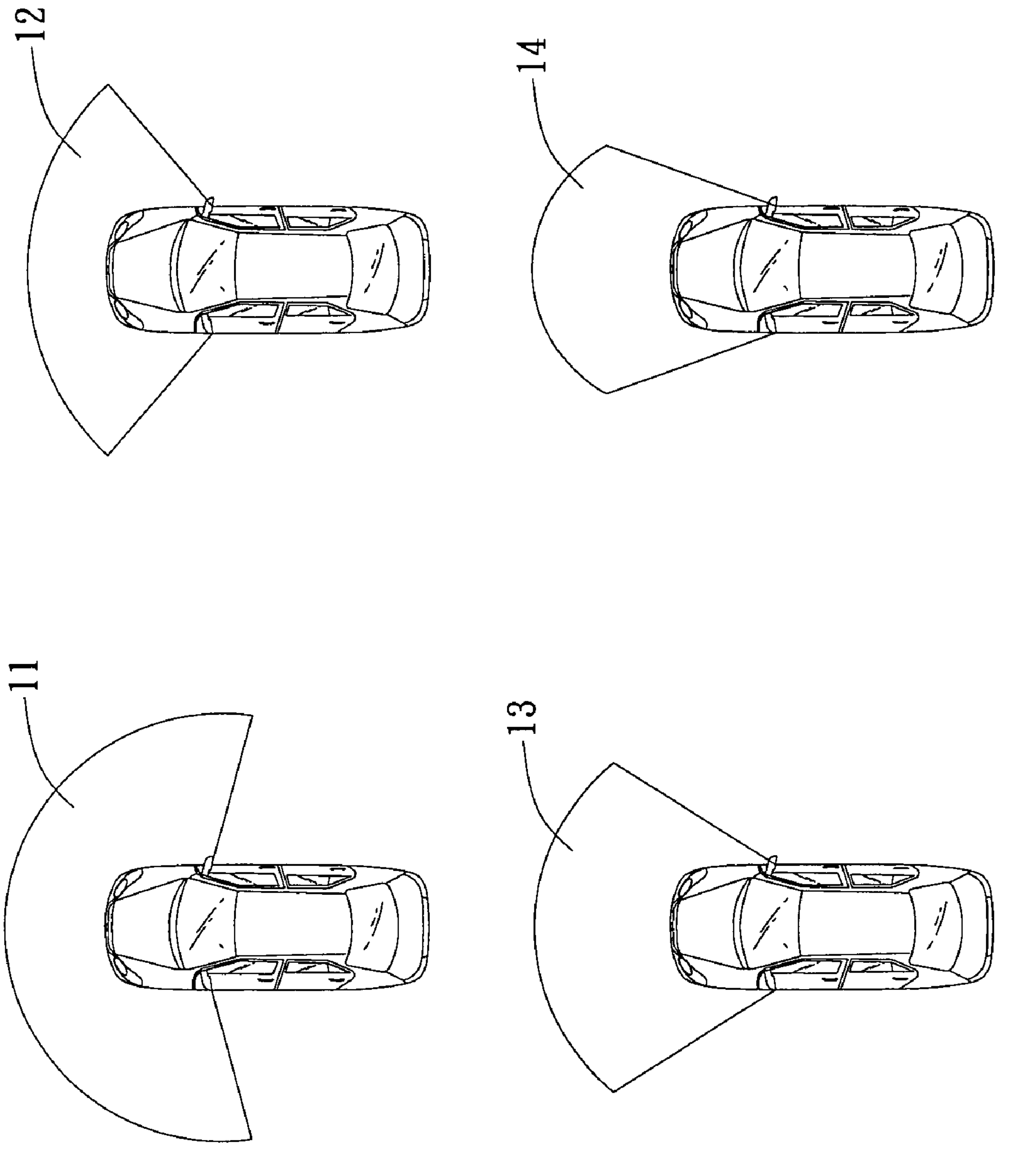
FIG. 1 shows how a driver's visual field is going to change with respect to different driving speeds.
Figure 2:
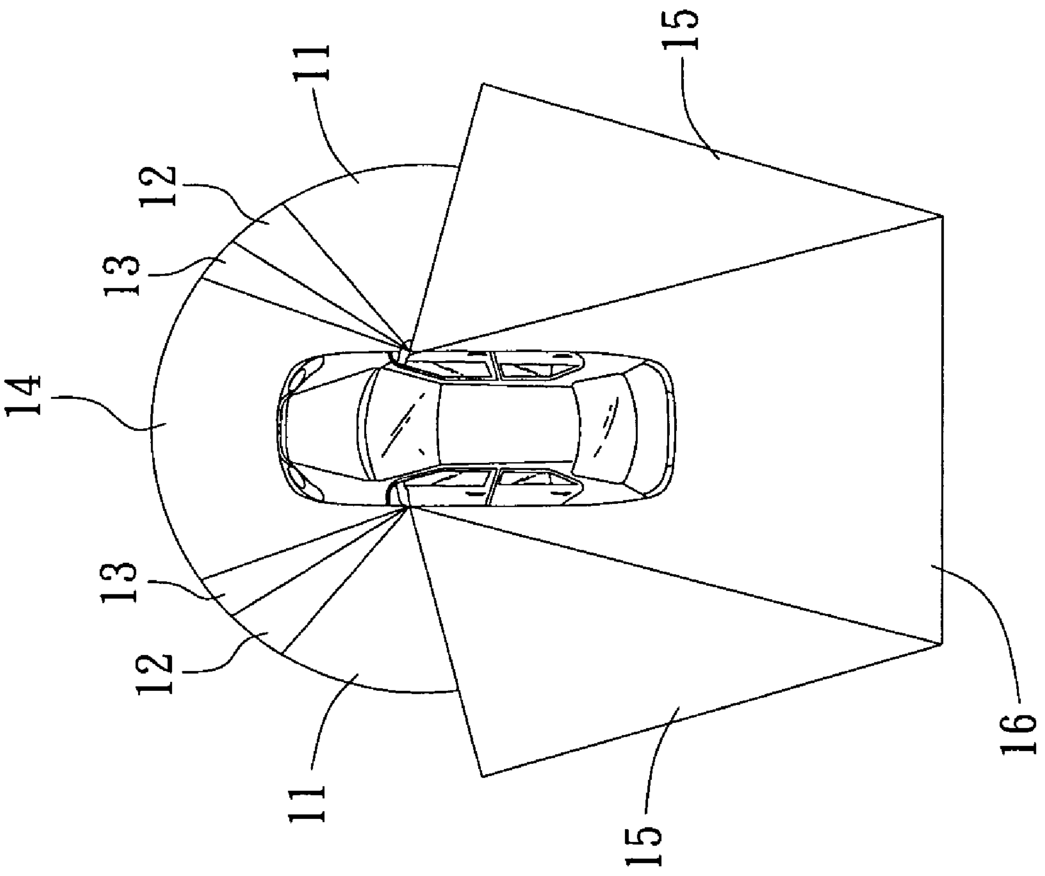
FIG. 2 shows how the blind spot area of a driver driving a vehicle is going to change with respect to different driving speeds.
Figure 3:
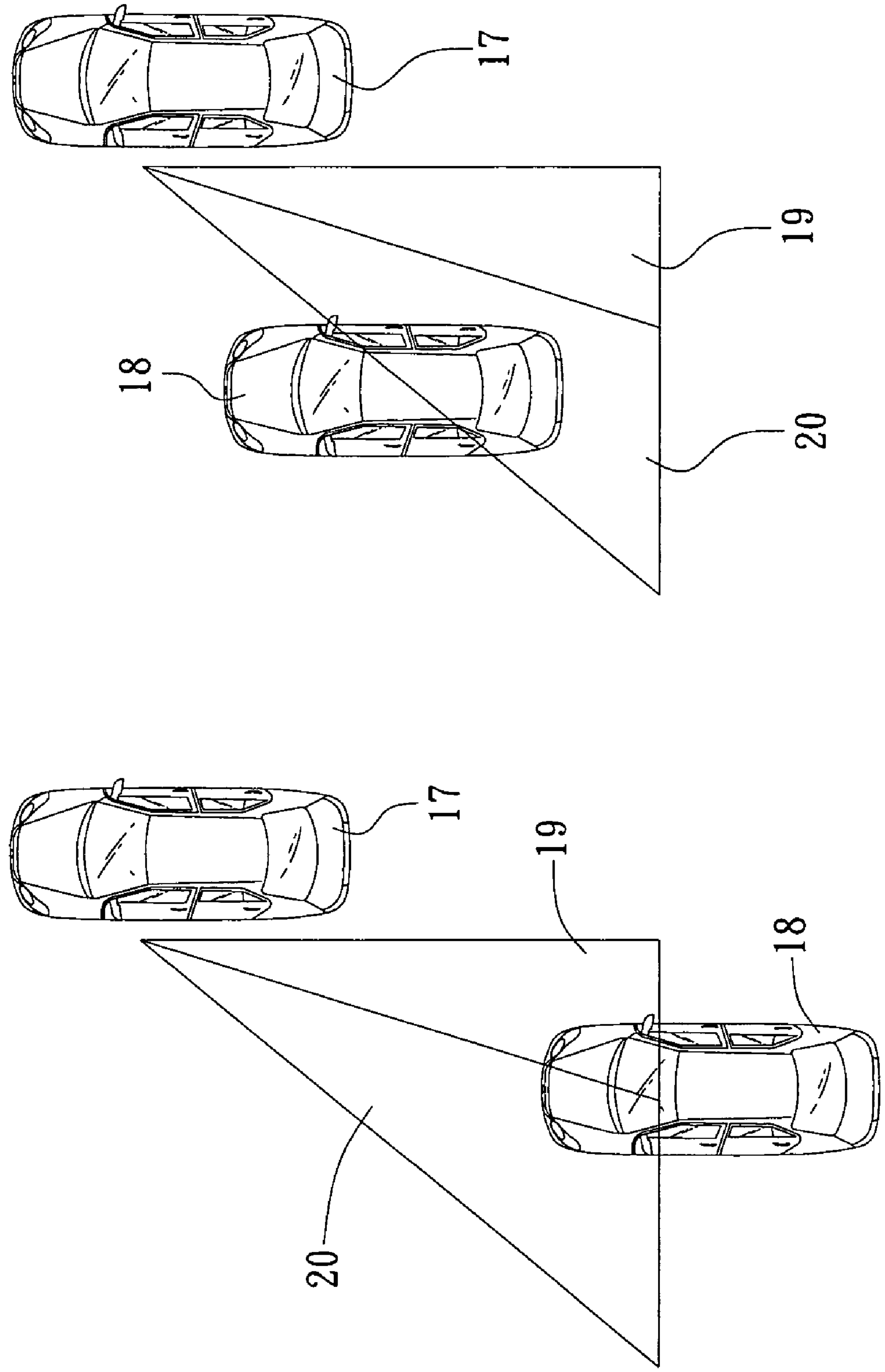
FIG. 3 is a schematic diagram showing a blind spot area formed at the left-rear side of a vehicle.
Figure 4:
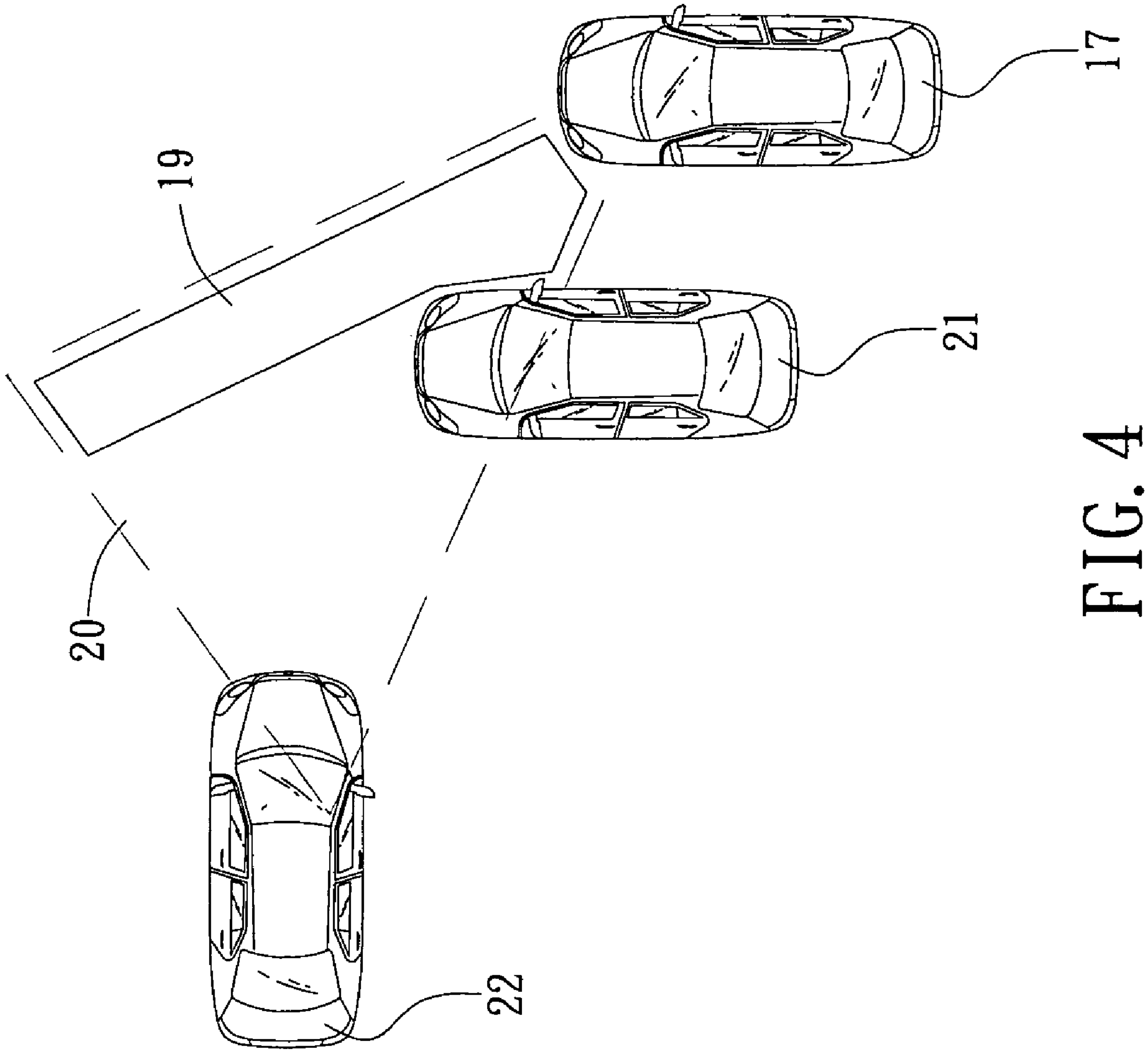
FIG. 4 shows a vehicle traveling in the visual field of a driver is shielded by another vehicle also traveling in the visual field and thus is hidden.
Figure 5:
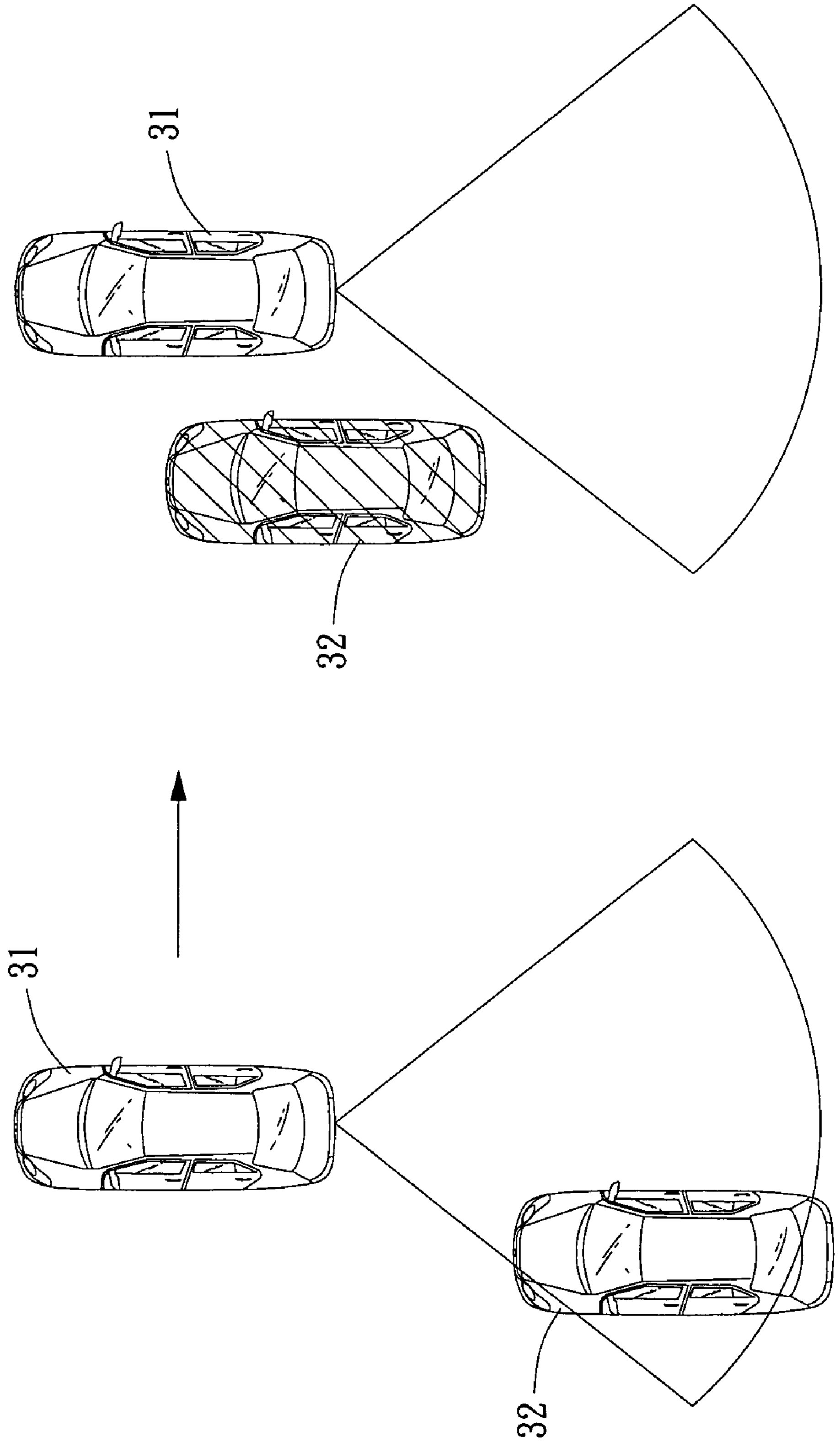
FIG. 5 is a schematic diagram showing how an apparatus of the invention is used for detecting a vehicle overtaking from the left when the vehicle is within the sensing range of the apparatus and thereafter predicting the movement of the overtaking vehicle when it is moving outside the sensing range.

Please refer to FIG. 5, which is a schematic diagram showing how an apparatus of the invention is used for detecting a vehicle overtaking from the left when the vehicle is within the sensing range of the apparatus and thereafter predicting the movement of the overtaking vehicle when it is moving outside the sensing range. In FIG. 5, as soon as the vehicle 32, overtaking the vehicle 31 from the left, enters the sensing range of the predicting/alarming apparatus mounted on vehicle 31, it is under constant tracking and monitoring, and even when it had already moved to a position outside the sensing range and into a blind spot of the driver driving the vehicle 31, the predicting/alarming apparatus still can predict the position of the overtaking vehicle 32 while displaying a shadowed vehicle-shaped icon on a displaying device of an alarming unit of the apparatus for reminding the driver. It is noted that the displaying device can be a liquid crystal display (LCD) and thus the alerting vehicle icon can be displayed to the driver by a device selected from the group consisting of a vehicle PC, a car LCD, a notebook computer, a personal digital assistant (PDA) and a global positioning system. Thereby, objects moving in the blind spot areas of the vehicle 31 can be detected.

Generally, the vehicle 31 can be any type of carriers that can be used as human transportation devices. It is noted that the carrier can be a car, a motorcycle, a bicycle, a robot or any other movable objects. As for the overtaking vehicle 32, it can also be any type of carriers and is going to be referred as moving object in the following description and drawings.

Figure 6:
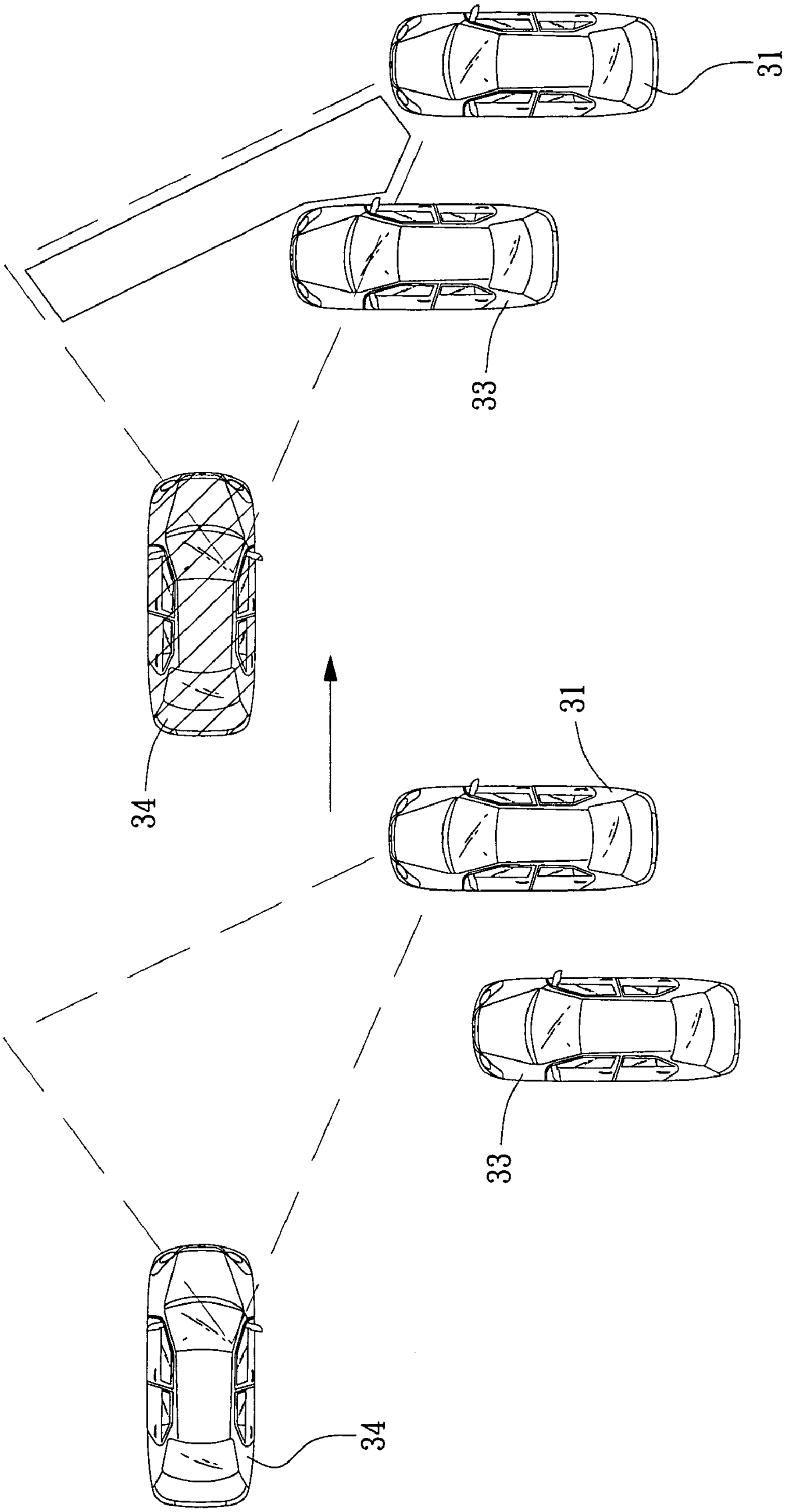
FIG. 6 is a schematic diagram showing how an apparatus of the invention is used for predicting the movement of a vehicle originally traveling in the visual field of a driver that is being shielded and thus hidden by another vehicle overtaking the same.

Please refer to FIG. 6, which is a schematic diagram showing how an apparatus of the invention is used for predicting the movement of a vehicle originally traveling in the visual field of a driver that is being shielded and thus hidden by another vehicle overtaking the same. In FIG. 6, the vehicle 34 was originally already being detected by the predicting/alarming apparatus mounted on the vehicle 31, but is now shielded and thus hidden by another vehicle 33 overtaking the vehicle 31 from the left. However, although the vehicle 34 is hidden behind the overtaking vehicle 33 and is now shielded from being seen by the driver driving the vehicle 31, the predicting/alarming apparatus mounted on the vehicle 31 can still predict the position of the hidden vehicle 34 while displaying a shadowed vehicle-shaped icon on a displaying device of an alarming unit of the apparatus for reminding the driver that a moving object 34, now positioning in the blind spot area, is moving toward you on the collision path. It is noted that the displaying device can be a liquid crystal display (LCD).

Figure 7:
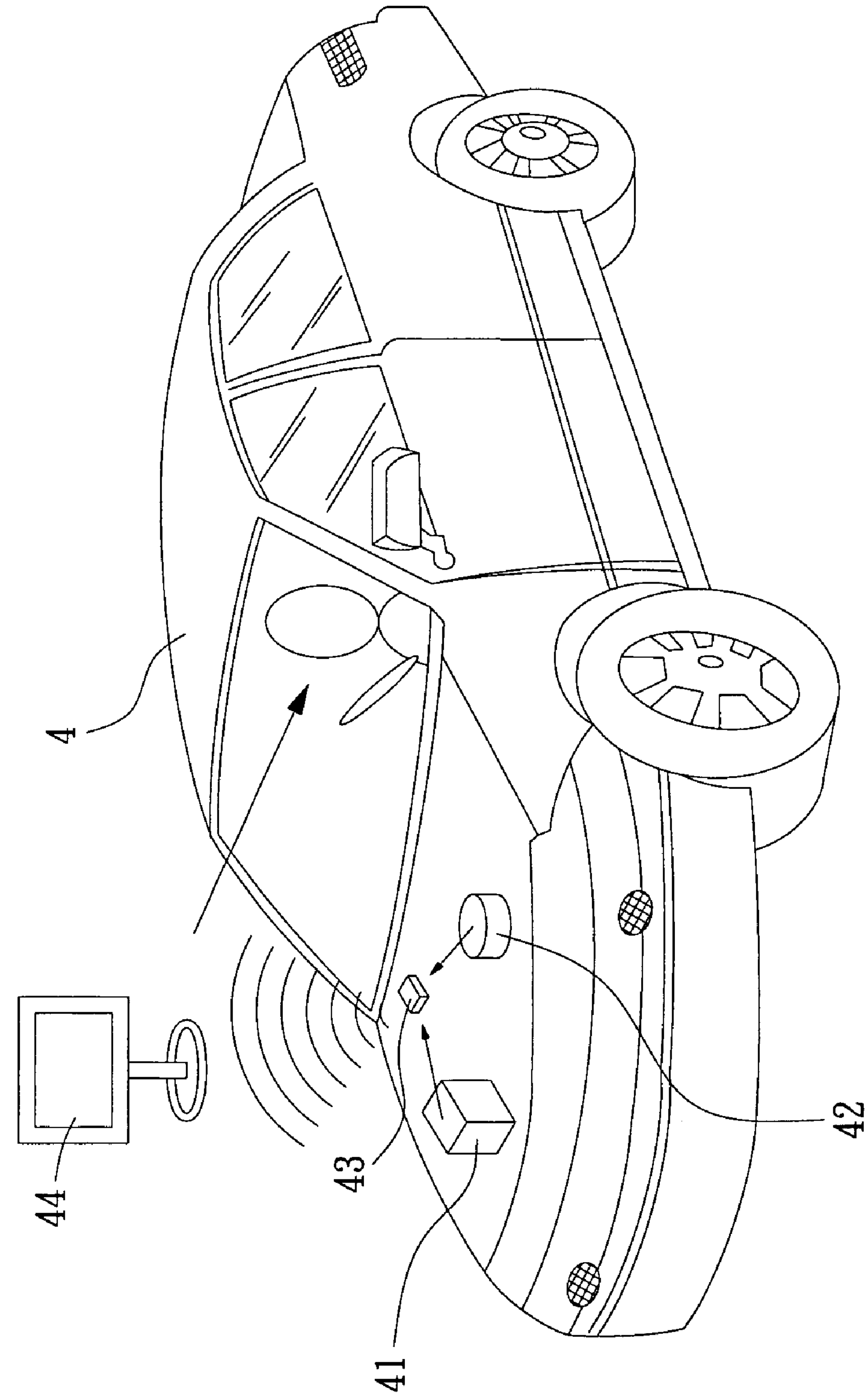
FIG. 7 is a schematic diagram showing an apparatus for predicting/alarming the moving of hidden objects according to an exemplary embodiment of the invention.
Figure 14:
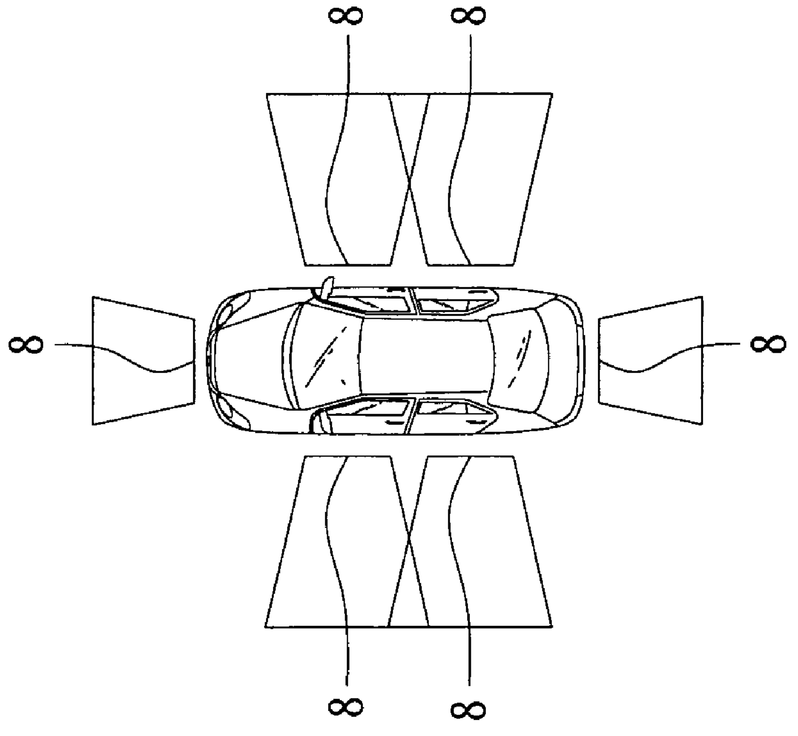
FIG. 14 is a schematic diagram showing the disposition of a plurality of sensing units of an apparatus of the invention on a vehicle.

Please refer to FIG. 7, which is a schematic diagram showing an apparatus for predicting/alarming the moving of hidden objects according to an exemplary embodiment of the invention. The apparatus for predicting/alarming the moving of hidden objects, being mounted on a carrier 4, comprises: at least a distance sensing unit 41, at least a speed sensing unit 42, a control unit 43 and an alarm unit 44. It is noted that the sensors 8, each including at least one distance sensing unit 41 and the at least one speed sensing unit 42, are located at arbitrary positions on the carrier 4 in a manner that each of they can detect any moving objects within a specific neighboring range of the carrier 4, as shown in FIG. 14. Moreover, the distance sensing unit 41 as well as the speed sensing unit 42 are configured to transmit data to the control unit 43 by the use of a wireless transmission interface, which can be a device selected from the group consisting of a Bluetooth module, an infrared (IR) module and a radio frequency (RF) transmission module. However, the aforesaid data transmission including those between the control unit 43 and the alarm unit 44 are not limited by the wireless mean, but can be achieved by any wired means. After the detected data is processed by the control unit 43, information relating to the position of the carrier, the environment surrounding the carrier and positions of objects moving in the blind spot areas of the carrier can be obtained which is then used to perform an evaluation based thereupon to determine a danger level for issuing a control signal to the alarm unit 44 to initiate an alerting indication. It is noted that the alerting indication issued by the alarm unit 44 is not limited to those icons shown in FIG. 5 and FIG. 6, and it can be an alerting sound or vibration. In an exemplary embodiment, the control signal is sent to a beeper or a speaker for enabling the same to issue a series of short beeps; or the control signal is sent to a vibrator mounted on the driver's safety belt for enabling the same to vibrate.

It is noted that the aforesaid distance sensing unit can be a device selected from the group consisting of a radar, a laser distance meter, an infrared array, an ultrasonic array and an image based range estimation module; and the speed sensing unit can be a device selected from the group consisting of a gyroscope, an accelerometer, a tachometer, a displacement sensor, a photo encoder, a global positioning system.

Figure 8:
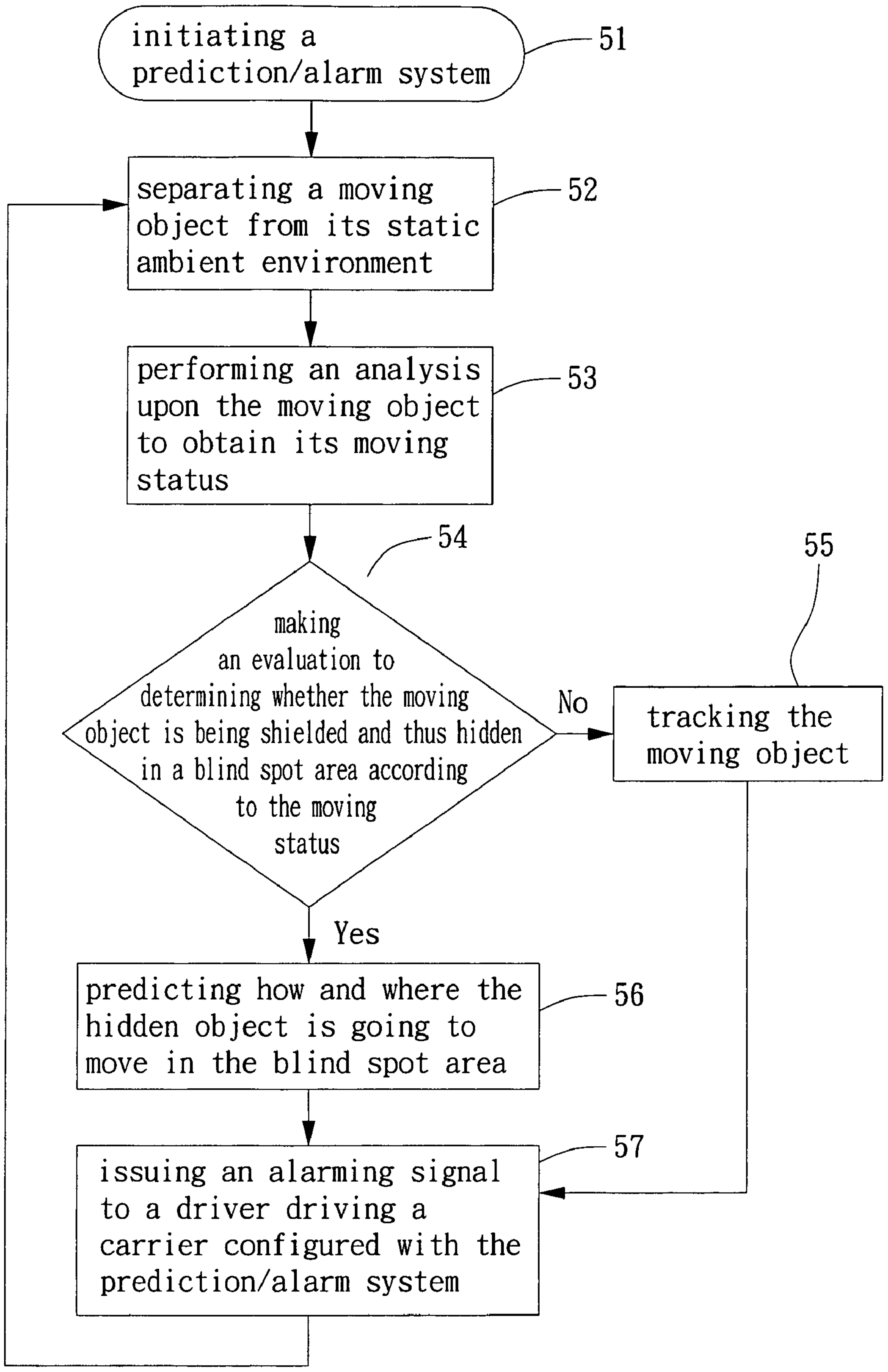
FIG. 8 shows the architecture of a method for predicting/alarming the moving of hidden objects according to the present invention.

Please refer to FIG. 8, which shows the architecture of a method for predicting/alarming the moving of hidden objects according to the present invention. The flow starts from step 51. At step 51, initiating a prediction/alarm system is initiated for activating those distance sensing units and the speed sensing units shown in FIG. 7; and then the flow proceeds to step 52. At step 52, if there is a moving object being detected, it is separated from its static ambient environment; and then the flow proceeds to step 53. At step 53, an analysis is performed upon the moving object to obtain its moving status by comparing the movement of the same with a specified default value; and then the flow proceeds to step 54. At step 54, an evaluation is made for determining whether the moving object is being shielded and thus hidden in a blind spot area according to the moving status; if so, the flow proceeds to step 56; otherwise, the flow proceeds to step 55. At step 55, the moving object is kept under the detection of the system; and the flow proceeds to step 57. At step 56, conditions regarding to how and where the hidden object is going to move in the blind spot area are predicted according to the moving status before it is being shield; and then the flow proceeds to step 57.

At step 57, an alarming signal is issued to a driver driving a carrier configured with the prediction/alarm system; and then the flow proceeds back to step 52.

In an exemplary embodiment, the predicting/alarming method of the invention can be realized by the use of a digital filter, as illustrated by the following equations:

$$x_t = f(x_{t-1}, u_t) + \epsilon_t$$

$$z_t = h(x_t) + \delta_t$$

wherein $x_i$ represents a current status of a carrier at time i, including the position of the carrier (x), the information relating to ambient environment of the carrier (m), and the positions of all the moving objects in the blind spot areas of the carrier (s);

$x_{i-1}$ represents the status of the carrier preceding the current status at time i−1, also including the position of the carrier (x), the information relating to ambient environment of the carrier (m), and the positions of all the moving objects in the blind spot areas of the carrier (s);

u represents information detected by the speed sensing unit at time i;

z represents information detected by the distance sensing unit at time i;

Thereby, a digital filter, which can be a Kalman filter, a particle filter or other Bayesian filters can be used for obtaining the $x_i$ by iteration, and thus the so-obtained $x_i$ is used for determining a danger level with respect to whether the carrier is on a collision path with the detected moving objects.

Figure 9:
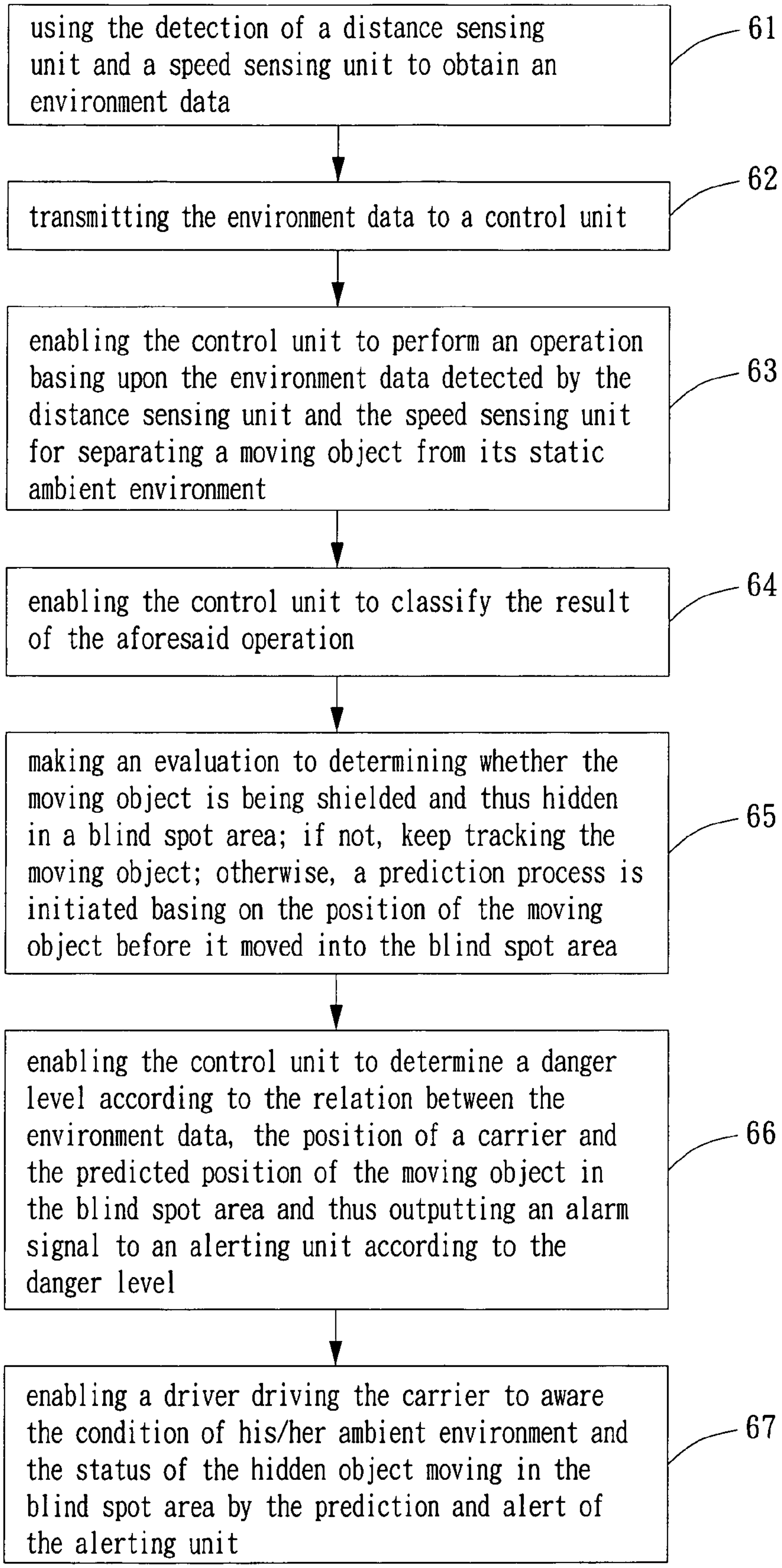
FIG. 9 is a flow chart depicting steps of a method for predicting/alarming the moving of hidden objects according to the present invention.
Figure 10:
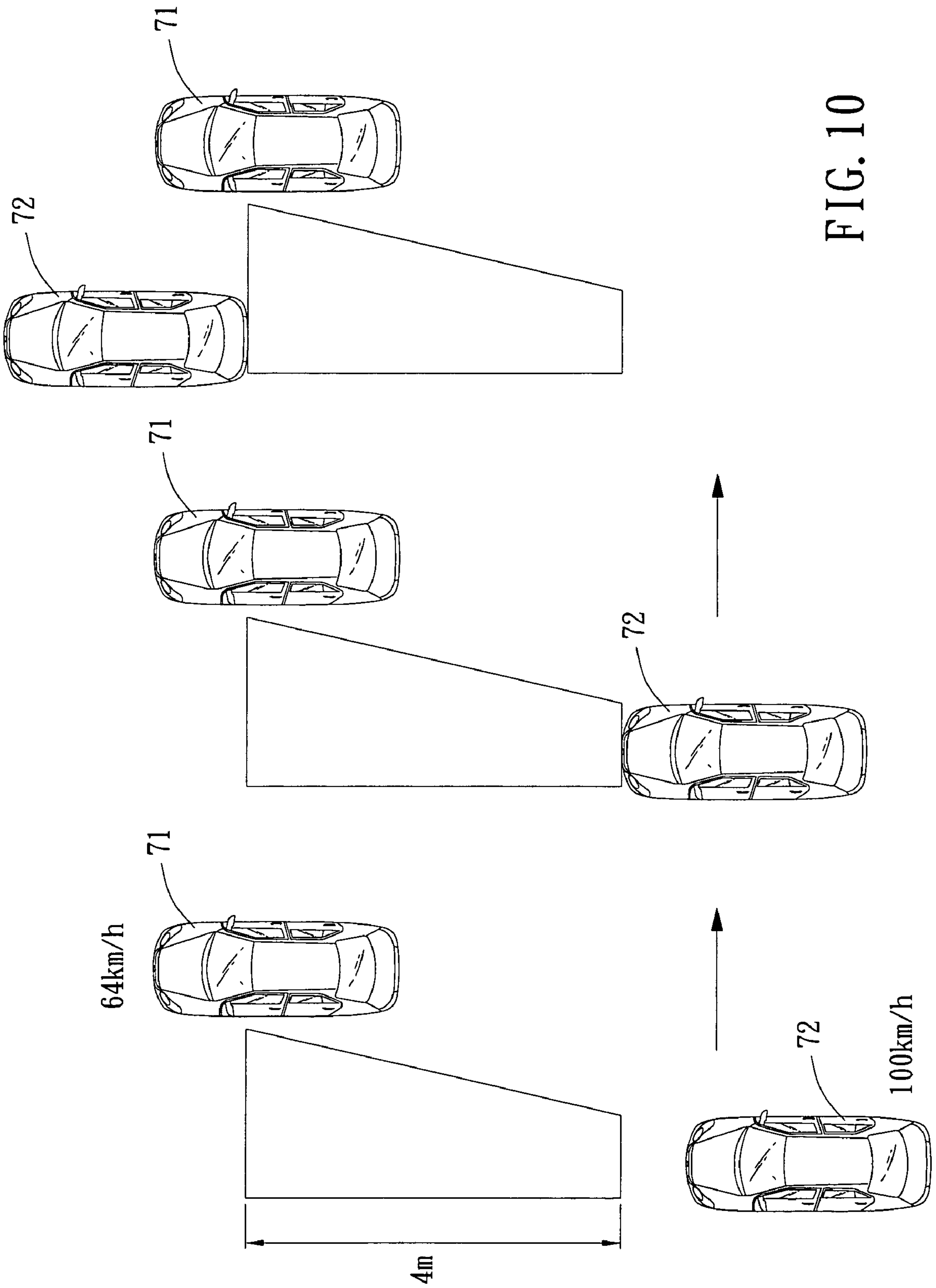
FIG. 10 is a schematic diagram showing the detection of a vehicle overtaking from the left using a conventional method and apparatus.

Please refer to FIG. 9, which is a flow chart depicting steps of a method for predicting/alarming the moving of hidden objects according to the present invention. The steps shown in FIG. 9 is realized by the use of the apparatus shown in FIG. 7 and is a detailed steps describing the flow chart of FIG. 8. The flow charts comprises the steps of:

Step 61: using the detection of a distance sensing unit and a speed sensing unit to obtain an environment data;

Step 62: transmitting the environment data to a control unit;

Step 63: enabling the control unit to perform an operation basing upon the environment data detected by the distance sensing unit and the speed sensing unit for separating a moving object from its static ambient environment;

Step 64: enabling the control unit to classify the result of the aforesaid operation;

Step 65: making an evaluation to determining whether the moving object is being shielded and thus hidden in a blind spot area; if not, keep tracking the moving object; otherwise, a prediction process is initiated basing on the position of the moving object before it moved into the blind spot area;

Step 66: enabling the control unit to determine a danger level according to the relation between the environment data, the position of a carrier and the predicted position of the moving object in the blind spot area and thus outputting an alarm signal to an alerting unit according to the danger level; and Step 67: enabling a driver driving the carrier to aware the condition of his/her ambient environment and the status of the hidden object moving in the blind spot area by the prediction and alert of the alerting unit Please refer to FIG. 10, which is a schematic diagram showing the detection of a vehicle overtaking from the left using a conventional method and apparatus. The method of the invention is featuring in that: it is capable of detecting and predicting movements of an moving object no matter the moving object is in sight or not. Taking the lane changing on superhighway for example, when a vehicle 71, being configured with a conventional blind spot detection system of 4 m detection range and traveling at 64 km/h, is overtaking from the left by another vehicle 72 traveling at 100 km/h, the conventional blind spot detection system can only provide the driver of the vehicle 71 with only 0.4 second for responding, that is, even the overtaking vehicle 72 is detected, the driver of the vehicle 71 initiating a lane change is not able to respond in time.

Figure 11:
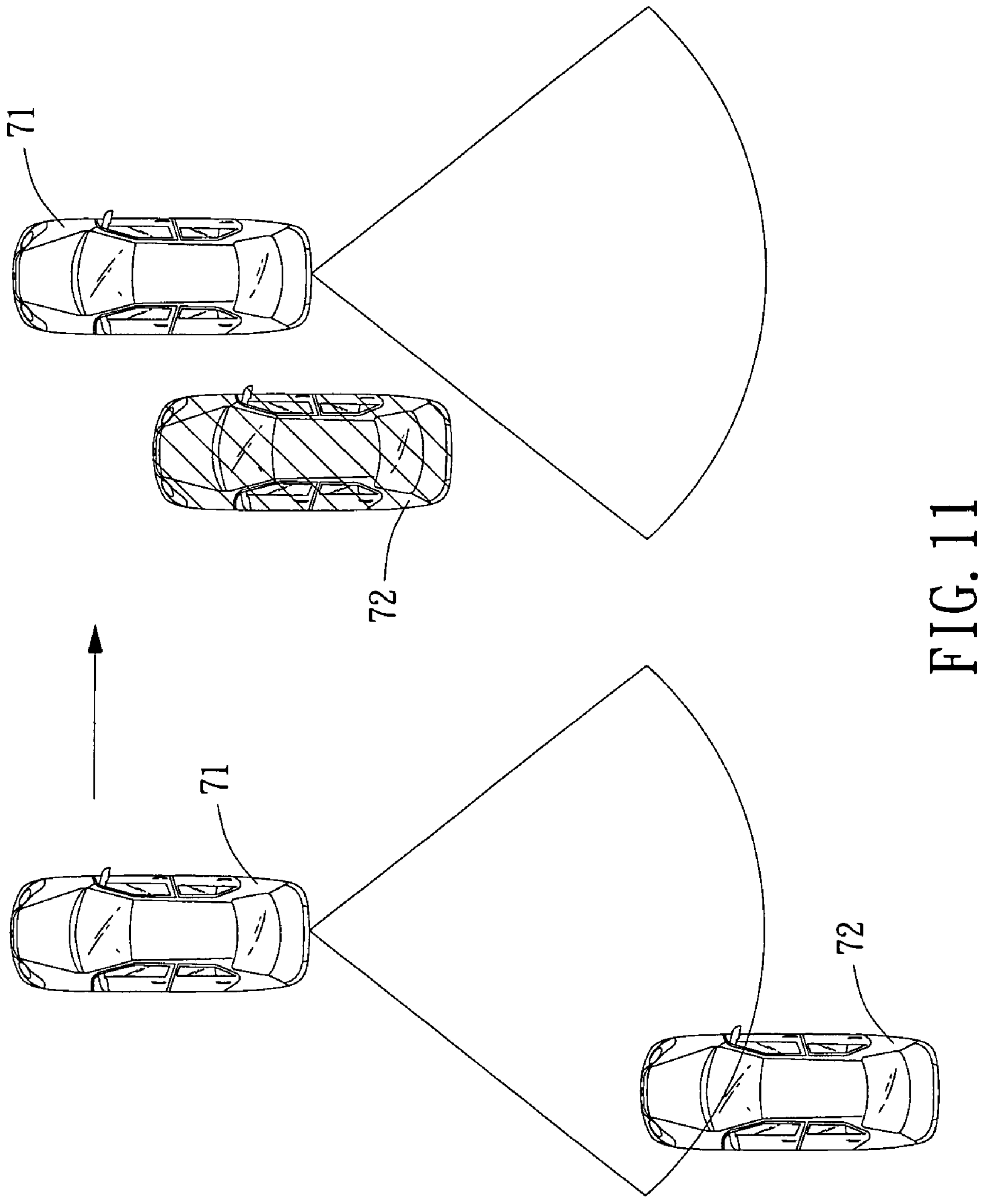
FIG. 11 is a schematic diagram showing the detection of a vehicle overtaking from the left using a method and apparatus of the present invention.
Figure 15:
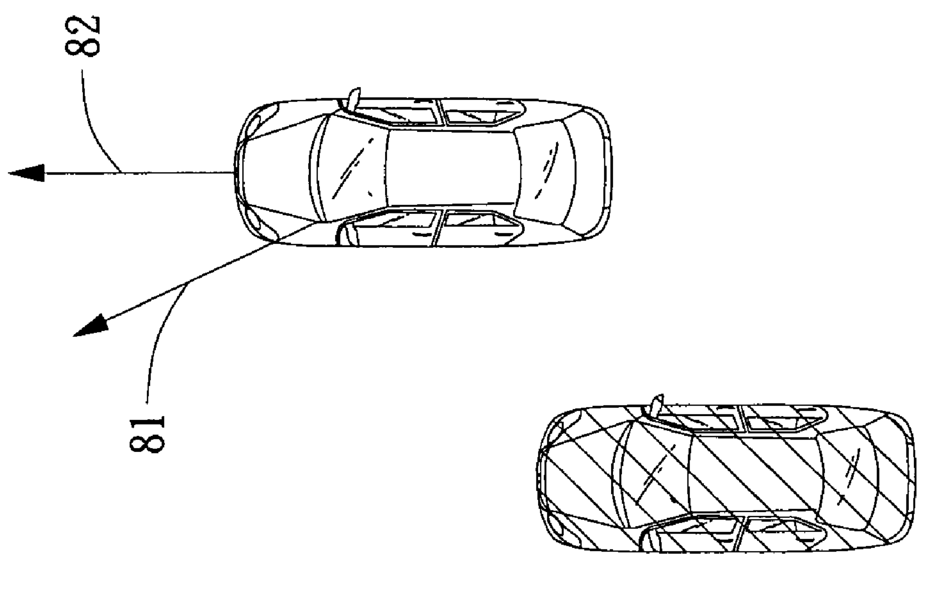
FIG. 15 is a schematic diagram showing an indication provided by the alarm unit of an apparatus of the invention as it detects the movement of a hidden object.

Please refer to FIG. 11, which is a schematic diagram showing the detection of a vehicle overtaking from the left using a method and apparatus of the present invention. By the use of the method and apparatus of the invention, the overtaking vehicle 72 can be located and tracked when it is stilling catching up from the behind of the vehicle 71 mounted with the predicting/alarming apparatus of the invention while the apparatus will keep alerting the driver of the vehicle 71 with information of the overtaking vehicle 71 including its position, velocity and acceleration until the overtaking vehicle 72 enters an area that is beyond the detection of the distance sensing unit and the speed sensing unit. However, the predicting/alarming apparatus can still predict the movement of the overtaking vehicle 72 and alert the driver while even enable the alarm unit to show a path recommendation to the driver, as shown in FIG. 15. For instance, the alarm unit can display a recommended path 82 on a displaying device for alerting the driver to change to the left lane 81 and thus avoid from colliding with the overtaking vehicle 72. The difference between the apparatuses shown in FIG. 10 and FIG. 11 is that: the apparatus of FIG. 11 can detect and predict movements of an moving object no matter the moving object is in its detection range or not while the apparatus of FIG. 10 can only detect the movement of those remain in its detection range and can not predict their movement after they are out of its detection range.

Figure 12:
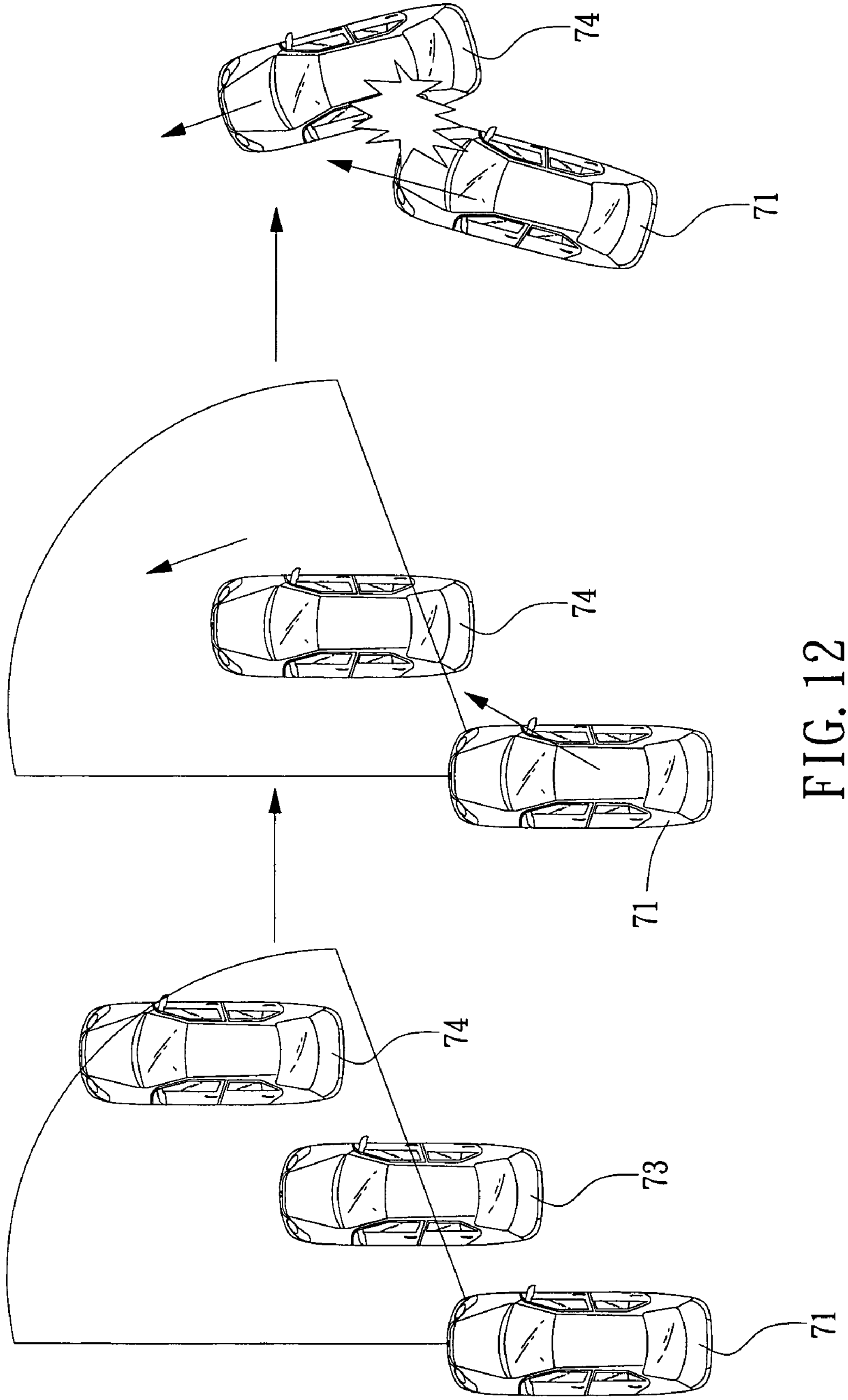
FIG. 12 is a schematic diagram showing the detection of a conventional method and apparatus as they are applied in a first vehicle overtaking a second vehicle from the left while there is a third vehicle overtaking the same second vehicle from the right almost at the same time.

Please refer to FIG. 12, which is a schematic diagram showing the detection of a conventional method and apparatus as they are applied in a first vehicle overtaking a second vehicle from the left while there is a third vehicle overtaking the same second vehicle from the right almost at the same time. When a vehicle 71 configured with a conventional detection apparatus is overtaking a second vehicle 73 from the left, the conventional detection apparatus can only detect the movement of the second vehicle 73 and is unable to detect a third vehicle 74 trying to take a left lane change to get in front of the vehicle 73 since it is being shielded by the second vehicle 73. Thus, if the vehicle 71 overtakes the second vehicle 73 almost at the same time when the third vehicle 73 move to the front of the second vehicle 73, collision between the vehicle 71 and the third vehicle 74 is almost inevitable.

Figure 13:
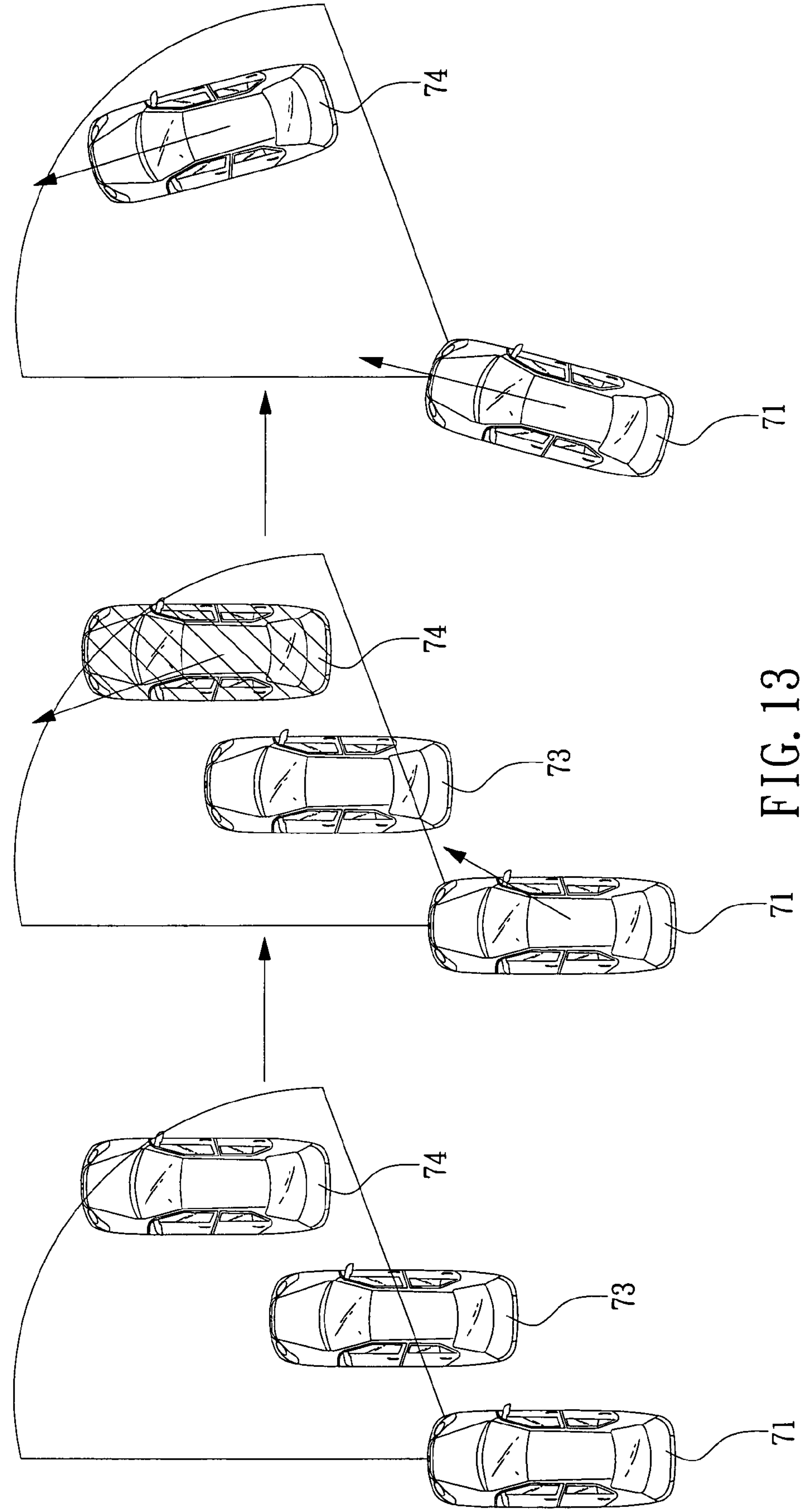
FIG. 13 is a schematic diagram showing the detection of a method and apparatus of the invention as they are applied in a first vehicle overtaking a second vehicle from the left while there is a third vehicle overtaking the same second vehicle from the right almost at the same time.

Please refer to FIG. 13, which is a schematic diagram showing the detection of a method and apparatus of the invention as they are applied in a first vehicle overtaking a second vehicle from the left while there is a third vehicle overtaking the same second vehicle from the right almost at the same time. The situation is the same as that described in FIG. 12, but instead of the conventional detection apparatus, the vehicle 71 is configured with the predicting/alarming apparatus of the invention. Thereby, once the third vehicle 74 is detected the by vehicle 71 and although the third vehicle 74 moved to a position that it is shielded and hidden behind the second vehicle 73, its movement can still be predicted and monitored by the driver of the vehicle 71 so that collision can be prevented.

To sum up, according to the description relating to FIG. 5 to FIG. 13, it is clear that the present invention can provide a method and apparatus for predicting/alarming the moving of hidden objects, using which when an object moving in the visual field of a user is shielded and hidden behind an obstacle, the aforesaid apparatus is able to obtain an environment data relating to the ambient environment of the user by the use of more than one distance sensing units, and a real-time speed data of the user by the use of a speed sensing unit, while using the two obtained data to perform a calculation basing upon a specific algorithm for obtaining the dynamic data of a moving object moving in a blind spot area of the user upon and thus issuing an alarm or indication based upon the dynamic data to the user. Therefore, a carrier such as a vehicle, configured with the aforesaid system and method, is able to actively assist its driver to detect no only those objects moving in conventional blind spots, but also those moving behind obstacles and hidden from being seen by the driver, and thus driving safely can be improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for predicting and alarming based on moving of hidden objects, comprising:

- a distance sensing unit, for obtaining a distance data detected within a specific sensing range;
- a speed sensing unit, for measuring the movement of the first moving object to obtain a real-time speed data of relating to the first moving object;
- a control unit, for performing each of the following operations:
  - receiving the distance data and the speed data from the distance sensing unit and the speed sensing unit, respectively;
  - separating the first moving object from its static ambient environment, and classifying the result;
  - determining information relating to the position of the first moving object by analyzing the distance data and the speed data, and determining a corresponding danger level;
  - predicting the first moving object's movement when the first moving object is within blind spot areas according to the distance data and the speed data;
  - predicting whether the first moving object is moving to a position shielded and hidden behind a second moving object;
  - predicting whether the first moving object is entering an area which cannot be monitored by the distance sensing unit and the speed sensing unit; and
  - issuing at least one corresponding control signal based on said classification, determinations, predictions, and danger level; and
- an alarm unit, for issuing an alarm signal according to the control signal.

2. The apparatus of claim 1, wherein the distance sensing unit is a device selected from the group consisting of a radar, a laser distance meter, an infrared array, an ultrasonic array and an image based range estimation module.

3. The apparatus of claim 1, wherein the speed sensing unit is device selected from the group consisting of a gyroscope, an accelerometer, a tachometer, a displacement sensor, a photo encoder, a global positioning system.

4. The apparatus of claim 1, wherein the distance sensing unit is substantially a distance sensing module composed of more than one distance sensor, each functioning independently to acquire a subsidiary distance data, from which the distance data is obtainable by performing a calculation upon all the subsidiary distance data with respect to the geometrical positions of the more than one distance sensors, and then the information relating to the position of the first moving object, the environment surrounding the carrier and positions of the first moving object moving in the blind spot areas of the carrier are obtainable by the calculation of the control unit using the distance data along with information accessed from an odometer of the carrier.

5. The apparatus of claim 1, wherein the speed sensing unit is composed of a plurality of speed sensors, each functioning independently to acquire a subsidiary inertial data of the first moving object relating to position, velocity, and acceleration, from which the speed data of the first moving object is obtainable by performing a calculation based upon all the subsidiary inertial data with respect to the geometrical positions of the plurality of speed sensors, and determining the information relating to the position of the first moving object, the environment surrounding the carrier, and positions of the first moving object moving in the blind spot areas of the carrier, obtained through control unit calculations using the speed data in combination with information accessed from an odometer of the carrier.

6. The apparatus of claim 1, wherein the alarm signal of the alarm unit is an indication prompting a response from a driver driving the carrier and being an indication selected from the group consisting of an alerting image of various contents, alerting sounds, and vibrations of various patterns.

7. The apparatus of claim 6, wherein the alerting image is displayed to the driver by a device selected from the group consisting of a vehicle personal computer (PC), a car liquid crystal display (LCD), a notebook computer, a personal digital assistant (PDA) and a global positioning system.

8. The apparatus of claim 1, wherein the outputting of the data from the distance sensing unit and the speed sensing unit is enabled by the use of a wireless transmission interface to the control unit.

9. The apparatus of claim 8, wherein the wireless transmission interface is a device selected from the group consisting of a Bluetooth module, an infrared module and a radio frequency transmission module.

10. The apparatus of claim 1, wherein the carrier or the first moving object is an object selected from the group consisting of a car, a motorcycle, bicycle, a robot and other moveable objects.

11. A method for predicting and alarming based on moving of hidden objects, comprising the steps of:

using the detection of a distance sensing unit and a speed sensing unit to obtain an environment data;

transmitting the environment data to a control unit;

enabling the control unit to perform an operation basing upon the environment data detected by the distance sensing unit and the speed sensing unit for separating a first moving object from its static ambient environment;

enabling the control unit to classify the result of the aforesaid operation;

making an evaluation to determining whether the first moving object is being shielded and thus hidden in a blind spot area of a carrier, wherein when the first moving object is not hidden in the blind spot areas of the carrier, keep tracking the first moving object; else when the first moving object moves to the blind spot areas, a prediction process is initiated to predict conditions regarding to how and where the first moving object is going to move basing on the position of the first moving object before it moved into the blind spot area, wherein the first moving object moving in the blind spot areas is a status including the first moving object moving to a position that it is shielded and hidden behind a second moving object, or the first moving object entering an area that is beyond the detection of the distance sensing unit and the speed sensing unit;

enabling the control unit to determine a danger level according to the relation between the environment data, the position of the carrier, and the predicted position of the first moving object in the blind spot area;

issuing at least one corresponding control signal based on said classification, determinations, predictions, and danger level;

outputting an alarm signal to an alerting unit according to the danger level; and enabling a driver driving the carrier to become aware of the condition of his/her ambient environment and the status of the hidden first moving object moving in the blind spot area by the prediction and alert of the alerting unit based on the alarm signal and at least one control signal.

12. The method of claim 11, wherein the distance sensing unit is a device selected from the group consisting of a radar, a laser distance meter, an infrared array, an ultrasonic array and an image based range estimation module.

13. The method of claim 11, wherein the speed sensing unit is device selected from the group consisting of a gyroscope, an accelerometer, a tachometer, a displacement sensor, a photo encoder, a global positioning system.

14. The method of claim 11, wherein the distance sensing unit is substantially a distance sensing module composed of more than one distance sensor, each functioning independently to acquire a subsidiary distance data, from which the distance data is obtainable by performing a calculation upon all the subsidiary distance data with respect to the geometrical positions of the more than one distance sensors, and then the information relating to the position of the first moving object, the environment surrounding the carrier and positions of the first moving object moving in the blind spot areas of the carrier are obtainable by the calculation of the control unit using the distance data along with information accessed from an odometer of the carrier.

15. The method of claim 11, wherein the speed sensing unit is substantially a speed sensing module composed of more than one speed sensor, each functioning independently to acquire a subsidiary inertial data relating to position, velocity, and acceleration, from which the speed data of the first moving object is obtainable by performing a calculation upon all the subsidiary inertial data with respect to the geometrical positions of the more than one speed sensors, and then the information relating to the position of the first moving object, the environment surrounding the carrier and positions of the first moving object moving in the blind spot areas of the carrier are obtainable by the calculation of the control unit using the speed data along with information accessed from an odometer of the carrier.

16. The method of claim 11, wherein the alarm signal of the alarm unit is an indication prompting a response from a driver driving the carrier and being an indication selected from the group consisting of an alerting image of various contents, alerting sounds, and vibrations of various patterns.

17. The method of claim 16, wherein the alerting image is displayed to the driver by a device selected from the group consisting of a vehicle personal computer (PC), a car liquid crystal display (LCD), a notebook computer, a personal digital assistant (PDA) and a global positioning system.

18. The method of claim 11, wherein the carrier or the first moving object is an object selected from the group consisting of a car, a motorcycle, bicycle, a robot and other moveable objects.

19. The method of claim 11, wherein the outputting of the data from the distance sensing unit and the speed sensing unit is enabled by the use of a wireless transmission interface to the control unit.

20. The method of claim 19, wherein the wireless transmission interface is a device selected from the group consisting of a Bluetooth module, an infrared module and a radio frequency transmission module.

* * * * *